March 12, 1963 M. W. FARLOW 3,081,245
METHOD FOR THE PREPARATION OF TETRAFLUOROETHYLENE
Filed March 17, 1960
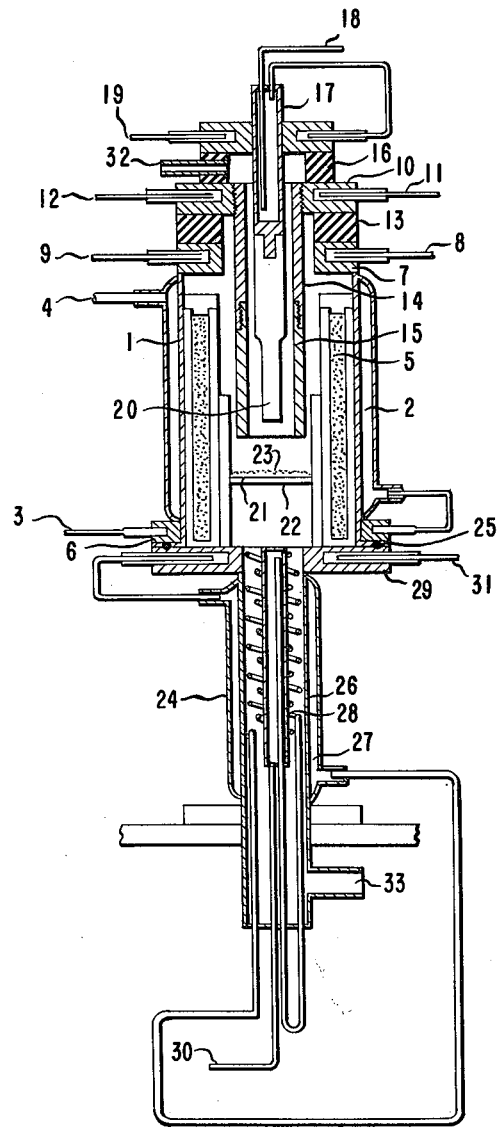
INVENTOR
MARK WENDELL FARLOW
BY
ATTORNEY United States Patent Office 3,081,245
Patented Mar. 12, 1963

3,081,245
METHOD FOR THE PREPARATION OF
TETRAFLUOROETHYLENE
Mark Wendell Farlow, Wilmington, Del., assignor to E. I. du Pont de Nemours and Company, Wilmington, Del., a corporation of Delaware
Filed Mar. 17, 1960, Ser. No. 15,585
3 Claims. (Cl. 204—169)

This invention relates to an improved method for synthesizing tetrafluoroethylene, and, more particularly, to an improved method of synthesizing tetrafluoroethylene in an electric arc.

The technical importance of fluorocarbons is constantly increasing. Tetrafluoroethylene, in particular, is of such high industrial interest that new and improved methods of synthesizing it are actively being sought. A recent technical advance in this field was the discovery that fluorocarbons can be prepared by reacting certain organic or inorganic fluorides with carbon at high temperatures, e.g., in a carbon arc, and that tetrafluoroethylene is present in very substantial amounts in the fluorocarbon product if the reaction temperature is above 1500° C. and if the gaseous reaction product is rapidly cooled, preferably to below 500° C., immediately following contact with the hot carbon. These high temperature processes constitute a major improvement in the field of fluorocarbon synthesis.

However, the high temperature processes of this type are not free of technical difficulties, especially when it is attempted to carry out the processes on a commercial scale. Thus, it was found that the synthesis of tetrafluoroethylene by reaction of saturated fluorocarbons, such as carbon tetrafluoride, with carbon, in a high energy arc, gives rise to decreasing yields of tetrafluoroethylene at increasing power consumption, as the size of the arc and the arc reactor in which the synthesis is carried out are increased from a laboratory scale to a commercial scale.

It is, therefore, the principal object of the present invention to provide a process for the synthesis of tetrafluoroethylene from saturated fluorocarbons in an arc reactor which is suitable for scale-up and gives rise to tetrafluoroethylene in high yields and at reasonable power consumptions. Other objects will become apparent hereinafter.

In accordance with the present invention, it was discovered that the synthesis of tetrafluoroethylene from saturated fluorocarbons, such as carbon tetrafluoride or hexafluoroethane, in an arc reactor lends itself to scale-up and commercial production at high yields of tetrafluoroethylene and at reasonable power consumption, if subsequent to the passage of the reactants through the arc the resulting gaseous reaction products are passed at a temperature of 2700° to 2000° C. through a carbon bed and then quenched to a temperature below 650° C. and, preferably, to a temperature below 500° C. in less than one second.

In the electric arc synthesis of tetrafluoroethylene from saturated fluorocarbons, reactants and reaction products go through tremendous temperature gradients. Thus, within a very short time carbon tetrafluoride, for example, is heated, as it approaches the arc and passes through the arc, to temperatures in the vicinity of 4000 to 5000° C. The reaction products that emerge at this temperature from the arc are then cooled or quenched to temperatures below 500° C., again within a very short time. As carbon tetrafluoride is heated to arc temperatures, it decomposes into fluorocarbon and fluorine fragments which are only stable at these high temperatures. These fragments on emerging from the arc lose energy, become unstable and form secondary types of fragments which similarly are only stable over a limited temperature range. On further cooling these form still different types of fragments, which, in turn, finally combine to form compounds stable at temperatures below 650° C. Some of these radicals, it was found, have a greater tendency to form tetrafluoroethylene than others which preferably form carbon tetrafluoride and other fluorine-rich compounds. Carbon-rich radicals, such as CF and $CF_2$, lead to the formation of tetrafluoroethylene.

It was discovered, in accordance with the present invention, that a substantial part of the carbon-rich fluorocarbon radicals are formed from fluorine fragments at temperatures below 2700° C. and above 2000° C. by reaction with carbon. If these fluorine radicals, however, are directly quenched to temperatures below 650° C. without having an opportunity to react with carbon, prior to quenching, these fragments result in the formation of saturated fluorocarbon compounds. It is, therefore, essential to react the gaseous reaction products emerging from the arc at temperatures below 2700° C. and above 2000° C. with carbon in order to obtain a high yield of tetrafluoroethylene, in addition to quenching the arc reaction products. It was further discovered that at temperatures below 1600° C. the reaction of fluorine fragments with carbon leads to the formation of stable, predominantly saturated molecules, and, furthermore, that the carbon-rich radicals remain absorbed on the carbon surface at temperatures below 1600° C. Hence, it was found to be necessary, in order to obtain high yields of tetrafluoroethylene, that the carbon be maintained preferably at temperatures of 2700° C. to 2000° C., but definitely above 1600° C. This necessary carbon is frequently provided in small electric arc equipment by the usual graphite construction of the reactor. However, if it is desired to scale up such a process, the arc reaction product must be passed through a carbon bed providing a large carbon surface in this critical temperature range. After passage through the carbon bed, the gaseous reaction products of the arc are quenched to below 650° C., and preferably to below 500° C., in less than 1 second, and preferably in milliseconds, by contact with cold solid surfaces.

Arc reactors employed in the process of the present invention basically comprise an electric arc between two electrodes, through which the saturated fluorocarbon is passed, a carbon bed in which the carbon-rich radicals are formed, and a quenching mechanism where the carbon-rich radicals are allowed to combine to form tetrafluoroethylene without going through the formation of radicals which lead to the formation of saturated fluorocarbon compounds. In this type of apparatus, the electrodes can be made of a heat- and corrosion-resistant metal, such as tungsten, or can be made of carbon. Metal electrodes can be kept relatively cool through internal circulation of a cooling liquid. Under such conditions they remain substantially unattacked through considerable periods of time. Especially suitable types of electric arcs for use in this process are magnetically rotated arcs. In comparison with static arcs of conventional design, a rotating arc is far more efficient by virtue of its much greater stability and of the far better contact between arc and reagents that it permits, resulting in much greater heating efficiency.

A particularly efficient type of rotating arc operates as follows:

The saturated fluorocarbon passes through a symmetrical annular gap, formed by a substantially cylindrical solid graphite cathode concentric with a substantially cylindrical hollow graphite anode in which a continuous electrical discharge is rotated by magnetic lines of flux essentially parallel to the axis of rotation of the arc in the gap. The magnetic lines of flux cause the arc to move at right angles to the magnetic field lines. The magnetic field is created by surrounding the arc chamber with a solenoid through which a current, preferably a direct current, is passed. A field strength suitable to cause rotation is 100 to 200 gauss. The arc rotates extremely rapidly in the annular gap between the electrodes, its speed being estimated at 1000 to 14,000 revolutions per second, and thereby heats the reactants very uniformly to extremely high temperatures as they pass through the gap.

The electrical characteristics of the rotating arc are essentially similar to those of the static arc. Thus, operating conditions of the arc may be varied over a wide range from a minimum voltage required to maintain the arc to very high voltages, e.g., in the range of 10 to 100 volts. In general, for a given current, the required voltage of the arc is determined by the pressure in the system, the width of the arc gap, and the nature of the gasses present in the arc chamber. The power requirements will, of course, depend on the quantities of reactants passed through the rotating arc and the temperature to which the arc is heated. The pressures employed in the process of the present invention are preferably maintained below 300 mm. of mercury, although it is feasible to employ higher pressures.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20 to 200 amperes are generally used.

As described above, the carbon bed employed in the process of the present invention is located downstream from the carbon arc at a point where the gaseous reaction product from the arc cools through the temperature range of 2700 to 2000° C. This temperature range, in general, determines the width of the carbon bed. Thus, the carbon bed has a width corresponding to the length of travel it takes for the arc reaction products on emerging from the arc to cool through the temperature zone of 2700 to 2000° C. The physical nature of the carbon bed is not critical. However, it should provide sufficient surface to allow contact of all of the gaseous reaction products passing through the carbon bed with the carbon of the bed. The chemical nature of the carbon is similarly not critical and any type of carbon of commercial purity may be employed. The exact location of the carbon bed in the arc reaction will vary with the intensity of the arc, the size of the arc, the quantity of the saturated fluorocarbon charged to the arc, and the pressure of the system. The geometry of the arc reactor will also affect the location of the carbon bed. In general, the location of the carbon bed is determined by measurement of the temperature profile in the arc reactor, or by placing a carbon probe into the carbon reactor downstream from the arc, operating the arc reactor, and determining the position of greatest carbon erosion.

After passage through the carbon bed, the gaseous reaction products are quenched to temperatures below 650° C. The necessary quenching can be achieved in various ways. For example, the gaseous reaction products, upon leaving the carbon bed, can be made to pass over the outside wall of a metal vessel containing a coolant material, such as water, solid carbon dioxide, or liquid nitrogen, and located a short distance from the carbon bed, or the arc gas can be passed through a double walled, hollow cylinder with or without radial fins, cooled with circulating water. In another modification, the off-gas is carried immediately from the hot zone into a suitably designed quench reactor where it comes into intimate contact with a finely-divided (fluidized), cold, solid which may advantageously be carbon.

The process of the present invention is further illustrated by the attached drawing which schematically shows, in cross-section, an arc reactor as employed in the present invention. Referring to the drawing, the reactor is constructed of a metal drum 1, cooled by water in jacket 2. Water enters the jacket at 3 and exits at 4. Into the reactor drum and concentric therewith is placed a graphite reactor liner 5 which contains loose graphite between two graphite walls. The drum 1 is attached to two flanges 6 and 7. The upper reactor flange is cooled by water through inlet 8 and outlet 9. The metal anode holder 10 in which cooling water circulates through inlet 11 and outlet 12 is separated from the reactor flange by the Micarta electrical insulating block 13. The metal anode holder is attached to the graphite anode holder 14 which, in turn, is threaded into the graphite anode 15. The anode of the reactor is separated by the Micarta electrical insulator 16 from the metal cathode holder 17 which also is water-cooled through inlet 18 and outlet 19. The graphite cathode 20 is threaded into the metal cathode holder 17. The arm is struck across the tip of the electrodes and is rotated in the annulus formed by the electrodes by means of an electromagnetic field formed by a solenoid concentric with the arc reactor, not shown on the drawing. The carbon bed 21 is inserted into the reactor by means of the graphite sleeve 22 and is adjustable in its distance from the arc by moving the graphite sleeve. The thickness of the carbon bed 21, comprising a porous carbon plate 22 and loose carbon particles 23, is controlled by the quantity of carbon placed on the carbon plate. The reactor rests on the water-cooled quencher 24 by means of an O-ring seal 25. The quencher comprises a narrow cylindrical drum 26 equipped with a water jacket 27, and contains a cooling finger 28 surrounded by quenching coils in the form of a helix. Cooling water circulates through the finger, the coils, and the jacket, as well as the quencher flange 29 entering at inlet 30 and exiting at outlet 31. Saturated fluorocarbons are introduced into the reactor at 32 and reaction products are removed at 33.

Using substantially the above-described equipment, the results shown in Table I below were obtained. A graphite anode having an inner diameter of 2 in. and a graphite cathode having an outer diameter of ½ in. were employed. Carbon tetrafluoride at a pressure of 30 to 40 mm. of mercury was charged at the rate of 0.5 cubic ft. per min. into the reactor. The arc was operated at 80 amp. and 90 to 100 volts and was rotated by a magnetic field of 100 gauss. As a carbon bed, a ⅛ in. porous carbon plate and .25 in. O.D. graphite rods of .25 in. length were employed. Table I shows the arc input power, the arc to bed distance, the bed thickness, the conversion of carbon tetrafluoride, the yield of tetrafluoroethylene and the efficiency of the system in the presence and absence of a carbon bed. As can be seen from Table I, a substantial improvement in yield of tetrafluoroethylene is obtained by the use of a carbon bed. The table further shows that the distance of the bed from the arc and the thickness, determined by the temperature range described above, are critical in obtaining the improvement in yield of tetrafluoroethylene.

*Table I*

| Arc Input Power, kw. | Arc to Bed Distance, in. | Bed Thickness, in. | Percent Conversion of $CF_4$ | Percent Yield of $C_2F_4$ | Kw./hr. lb. $C_2F_4$ |
|---|---|---|---|---|---|
| 7.6 | no bed | no bed | 14.1 | 60.2 | 12.1 |
| 7.6 | 1.0 | 0.50 | 11.4 | 87.4 | 10.3 |
| 7.2 | 0.50 | 0.25 | 12.6 | 84.7 | 9.42 |
| 7.2 | 0.38 | 0.25–0.50 | 13.9 | 74.7 | 11.0 |

In another series of experiments, a graphite cathode having a diameter of 1/8 to 3/16 in. and various graphite anode designs were employed in the magnetically rotated arc reactor shown in U.S. 2,924,625, issued to William O. Forshey, Jr., on February 9, 1960. The I.D. of the anode was in all cases 0.4375 in. In design A, the anode was water-cooled up to 5/8 in. from the tip of the anode. In design B the anode was water cooled up to 1/8 in. from the tip of the anode. In design C, the water-cooling system was removed 1 5/8 in. from the tip of the anode and a 1/2 in. long perforated carbon cylinder having seven 1/16 in. axial passages and a diameter equal to the I.D. of the anode was inserted to 3/8 in. from the tip of the anode. In design D the anode was water-cooled to 1/8 in. from the tip of the anode and the perforated carbon cylinder was placed 1 1/2 in. from the tip of the anode. The arc was operated at about 35 to 40 amperes at about 30 volts direct current. The arc chamber was maintained at a pressure of 20 mm. Hg. The arc rotated at a rate of about 4000 to 6000 cycles/second. Carbon tetrafluoride was fed to the arc at a rate of 35 g./hr. in a direction such that it passed through the arc flame, then through the cylindrical anode and thereafter through the water-cooled portion of the anode, where the arc products were quenched. The composition of the product gases with the various anode designs is given in Table II.

*Table II*

| Product | Mole Percent—Anode | | | |
|---|---|---|---|---|
| | A | B | C | D |
| Carbon Tetrafluoride | 36 | 73 | 29 | 96 |
| Tetrafluoroethylene | 48 | 17 | 63 | 0.1 |
| Hexafluoroethane | 11 | 6 | 4 | 1 |
| Higher Fluorocarbons | >5 | >5 | >5 | >5 |

Again, these data demonstrate the criticality of the presence of a carbon bed as well as the importance of the location of the carbon bed, i.e., the temperature at which the arc products contact the carbon bed.

It is to be understood that the foregoing description is merely illustrative of the invention described and is not intended to limit the invention. In essentially the same way, giving rise to the same high yields of tetrafluoroethylene, there may be used hexafluoroethane and higher saturated perfluorinated hydrocarbon compounds. Similarly, various modifications of the equipment described will occur to those skilled in the art.

The use of the carbon bed as described hereinabove permits the application of the rotating arc to the synthesis of tetrafluoroethylene from saturated fluorocarbons on a commercial scale and results in high yields at reasonable power consumptions.

I claim:

1. A process for the preparation of tetrafluoroethylene which comprises feeding a saturated perfluorocarbon to a continuous electric arc, passing the emerging gaseous product through a carbon bed at a temperature of 2700° C. to 2000° C., and thereafter quenching the resulting gaseous reaction product to a temperature below 500° C. in less than one second.

2. A process for the preparation of tetrafluoroethylene which comprises feeding carbon tetrafluoride to a continuous electric arc, passing the emerging gaseous product through a carbon bed at a temperature of 2700 to 2000° C., and thereafter quenching the resulting gaseous reaction product to a temperature below 500° C. in less than one second.

3. The process set forth in claim 2 wherein the arc is a direct current arc, struck between concentric electrodes, and rotated by a magnetic field in the annular gap.

References Cited in the file of this patent

UNITED STATES PATENTS

| 996,951 | Thoresen et al. | July 4, 1911 |
| 2,709,192 | Farlow | May 24, 1955 |
| 2,757,212 | Cleaver et al. | July 31, 1956 |
| 2,929,771 | Landis et al. | Mar. 22, 1960 |